Sept. 9, 1969         YOSHICHIKA SAKAMOTO         3,466,126
SLIDE-HOLDING FRAME AND A FILE PLATE FOR FILING SUCH FRAMES
Filed April 22, 1966                          5 Sheets-Sheet 1
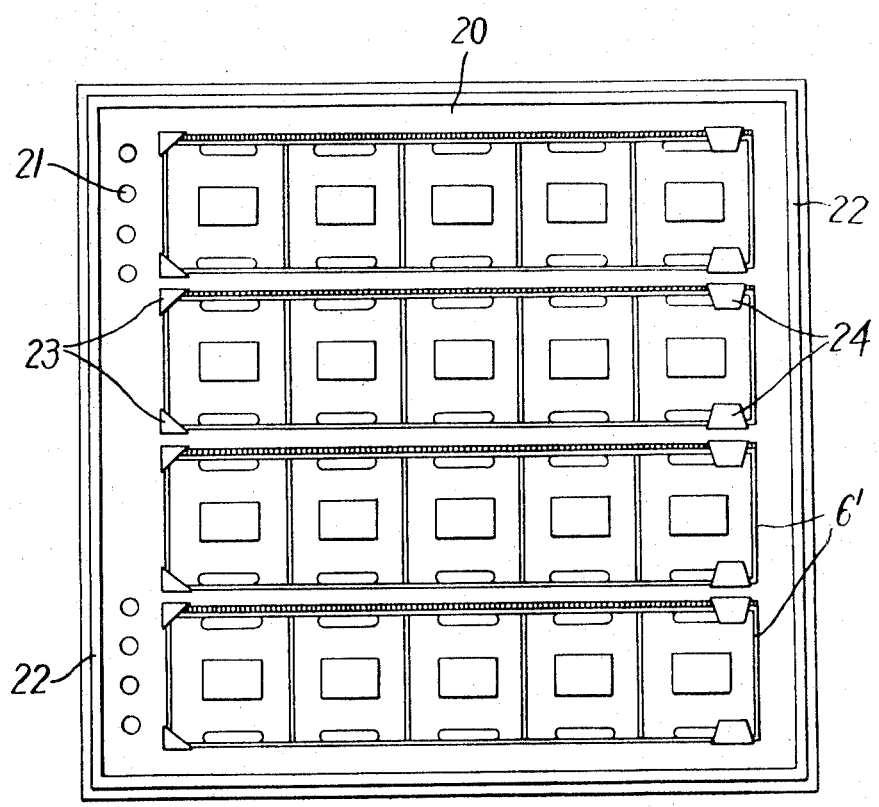
INVENTOR
YOSHICHIKA SAKAMOTO
BY
ATTORNEY Sept. 9, 1969   YOSHICHIKA SAKAMOTO   3,466,126
SLIDE-HOLDING FRAME AND A FILE PLATE FOR FILING SUCH FRAMES
Filed April 22, 1966   5 Sheets-Sheet 2
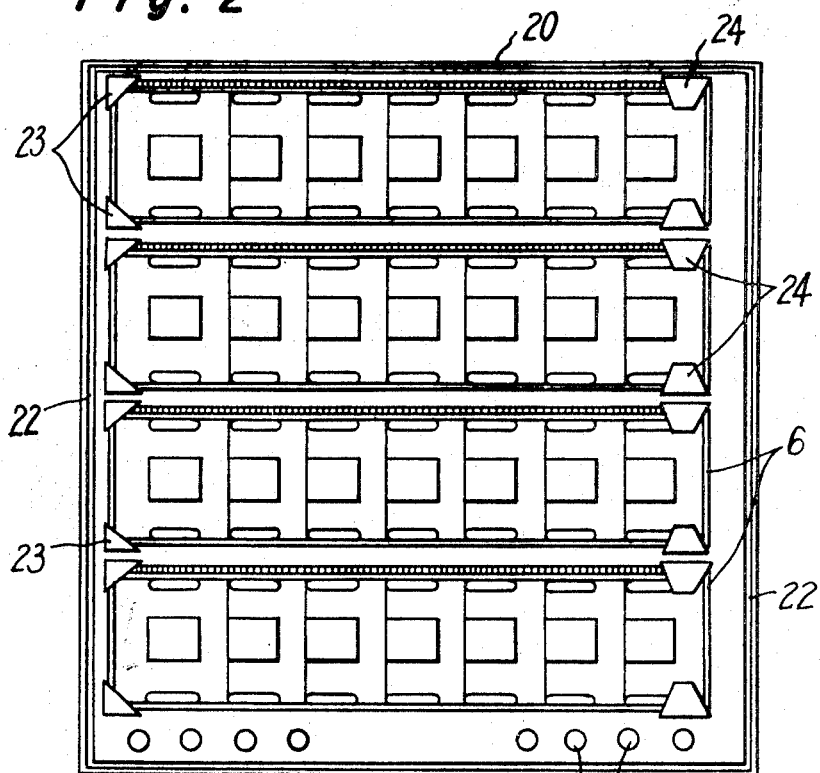
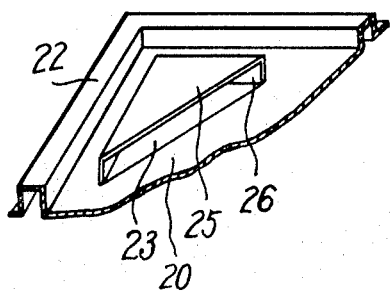
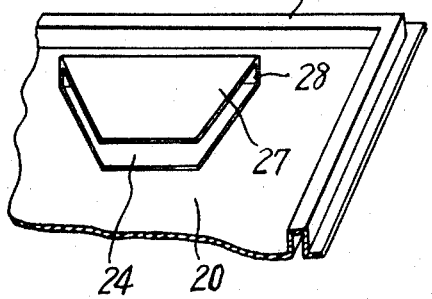
INVENTOR
YOSHICHIKA SAKAMOTO
BY
ATTORNEY

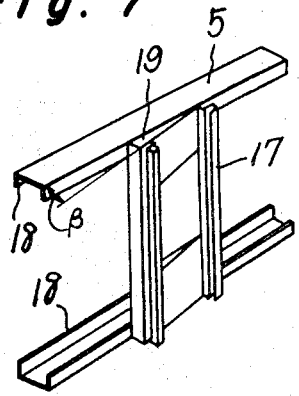
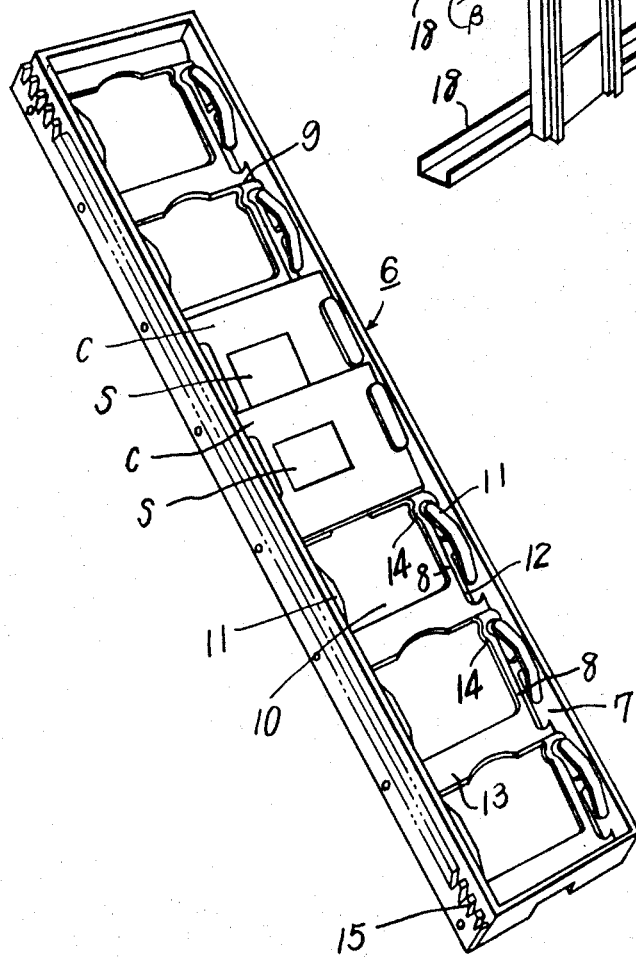

Sept. 9, 1969     YOSHICHIKA SAKAMOTO     3,466,126
SLIDE-HOLDING FRAME AND A FILE PLATE FOR FILING SUCH FRAMES
Filed April 22, 1966                    5 Sheets-Sheet 5
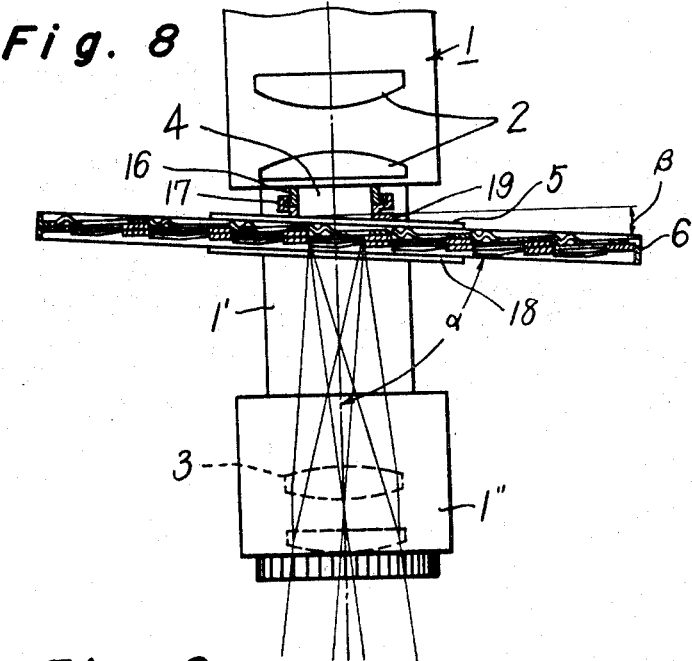
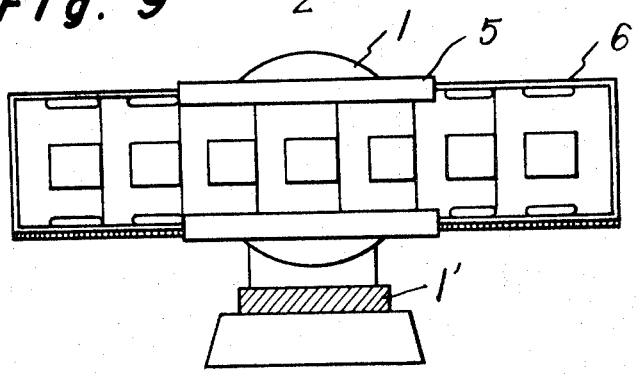
INVENTOR
YOSHICHIKA SAKAMOTO
BY *Irvin S. Thompson*
ATTORNEY

United States Patent Office 3,466,126
Patented Sept. 9, 1969

3,466,126
SLIDE-HOLDING FRAME AND A FILE PLATE FOR FILING SUCH FRAMES
Yoshichika Sakamoto, 214 2-chome, Sengen-cho, Ohmiya, Japan
Filed Apr. 22, 1966, Ser. No. 544,451
Claims priority, application Japan, Apr. 28, 1965 40/24,686; July 16, 1965, 40/57,878
Int. Cl. G03b 23/10; G09f 11/30
U.S. Cl. 353—108
2 Claims

ABSTRACT OF THE DISCLOSURE

A slide-holding frame holds a straight row of slides with their blank edges overlapped to save space. A plurality of frames are held by their corners on a file plate. The slides are projected by moving the frame through the projector at an acute angle to the optical axis so that the slides themselves are perpendicular to that axis.

---

This invention relates to a novel file plate for filing photographic film slides and a novel method and apparatus for projecting photographic film slides filed in the same, more particularly a novel file plate for filing a plurality of slide holding frames having several photographic film slides in a row, method for projecting photographic film slides as held in said slide holding frame at a considerably improved space factor by successively overlapping a part of peripheral blank border portions of each photographic film slide, and devices therefor.

In one of the conventional filing plates for photographic film slides, some 15 to 30 individual frameworks are formed in each filing plate to hold a film slide in each framework, and a transparent or translucent window is provided for each framework at such portion which faces the photographic film portion of the film slide inserted therein in order to facilitate inspecting, indexing and viewing film slides as they are held in such filing plates. However, it has been rather troublesome to take out a selected film slide individually from such filing plate to inert it in a projector for projection and return it to its original storing position in the filing plate upon finishing the projection.

The inventor has disclosed a projector capable of projecting film slides as held in such filing plate, as described in the copending U.S. patent application No. 465,040, filed on June 18, 1965, now abandoned in order to eliminate the above troublesome procedure in inserting and removing the selected film slides, however, such projectors sometimes becomes rather bulky for certain applications.

It has been also known to use a long frame holding several photographic film slides in a single row which is specially adapted to fit a special cooperating projector so that a selected slide may be projected in the state as held in said long frame, but such long frame is made primarily for facilitating projecting procedures only, and the above troublesome procedures in removing and returning selected film slides from and to storing means, such as said filing plates, had not been heretofore solved.

The primary object of the invention is to obviate such inconvenience in introducing and removing individual film slides to and from the projector by providing a novel filing plate for filing a number of said single rowed slide holding frames, whereby any of a desired group of slide pictures can be projected readily by withdrawing a slide holding frame having said group of film slides from the filing plate and inserting it in a projector adapted to cooperate with such slide holding frame for projecting each film slide of said group in the state as held in said frame without necessitating movement of individual film slides one by one. Said group of film slides can be also readily removed from the projector and placed on the filing plate in a similar but reversed manner by using said slide holding frame. Accordingly, the process of projecting photographic film slides is greatly improved and simplified.

In addition, a number of said plates for holding a plurality of slide holding frames can be filed in an album form, which simplifies the procedure for exhibiting, inspecting, viewing, and selecting photographic film slides stored in a storing means.

If, however, the number of film slides to be held in a slide holding frame of said type is increased for certain reasons, the dimension thereof will be inevitably increased to a considerable extent, and the filing plates for holding such frames may become too large for practical applications due to additional complications in handling them for projecting and storing.

In order to obviate the above inconveniences, the inventor has noticed the fact that each photographic film slide has fairly wide blank spaces on its peripheral borders consisting of the mounting frame of the film, and has discovered that the number of film slides to be placed in a slide holding frame can be increased by means of overlapping said blank border spaces of adjacent film slides with each other. The invention is to provide a slide holding frame to hold a greater number of film slides in partially overlapped manner, a method of projecting film slides as held in said slide holding frame by sliding said slide holding frame in such angular relations with the optical axis of the light beam from the condenser lenses of a projector disposed so that each film slide in the slide holding frame is always perpendicular to said optical axis, and a slide projector therefor.

Another object of the invention is to provide a novel method of projecting photographic film slides as held in a slide holding frame which holds a number of film slides by successively overlapping the peripheral blank border portions of adjacent film slides, wherein the inclination of each film slide due to said overlapping is so compensated as to set each film slide perpendicular to the optical axis of the light beam from the condenser lenses.

Another object of the invention is to provide a novel projector which is adapted to give a proper angular compensation for the inclination of each film slide held in a slide holding frame in a partially overlapped manner.

A further object of the invention is to provide a novel slide holding frame to hold a large number of film slides within a limited dimension at a high space factor, which can be utilized both for projecting and filing purposes.

A still further object of the invention is to provide a filing plate to file a number of said slide holding frames in order to facilitate storing, inspecting, indexing and directly viewing film slides.

For a better understanding of the invention reference is had to the accompanying drawings, in which:

FIG. 1 is a plan view of a filing plate for filing a plurality of slide holding frames as shown in FIG. 5;

FIG. 2 is a plan view of a filing plate for filing a plurality of slide holding frames as shown in FIG. 6;

FIGS. 3 and 4 are partial perspective views illustrating different corner holders respectively to be used in the filing plate shown in FIGS. 1 and 2;

FIG. 6 is a perspective view of a slide holding frame embodying the present invention;

FIG. 7 is a perspective view of a guide means to guide the slide holding frame of FIG. 6 in an angular relation to the optical axis of a special slide projector embodying the present invention;

FIG. 8 is a partial plan view of an embodiment of the slide projector according to the invention; and FIG. 9 is a front elevation of the slide projector with the projection lenses thereof removed.

Figure 5:
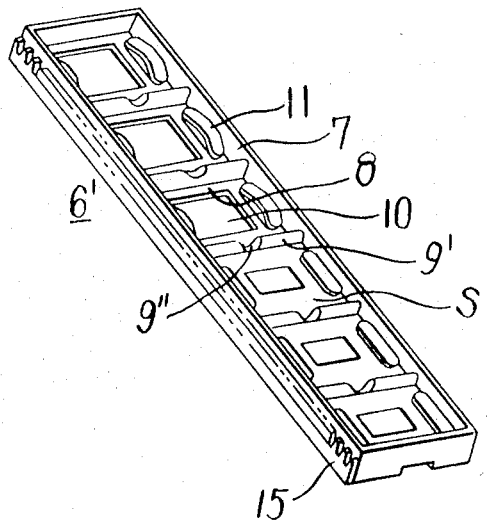
FIG. 5 is a perspective view showing a conventional slide holding frame to hold several photographic film slides in a row.

FIG. 1 shows a filing plate for filing a plurality of the slide holding frames 6' of known type as shown in FIG. 5. The filing plate 20 is generally rectangular and provided with a series of filing holes 21 along one side edge thereof as well as border projections 22, which prevent the slide holding frame 6' from dropping out of the filing plate once inserted therein and protect the photographic slides held in a filing plate against damage due to their contact with any part of adjacent filing plates. In order to hold several slide holding frames 6' in a filing plate 20, a plurality of pairs of corner holders 23 and 24 respectively are provided in each filing plate 20. Said corner holders 23 and 24 may be formed by pressing or punching out of the bottom plate of the filing plate, or may be secured to the filing plate after shaping them separately.

FIG. 3 shows the corner holder 23 to stop the slide holding frame 6' at the end of the inserting operation and hold the inserted end corners thereof, which comprises a right-angled triangular top plate 25 and a pair of side plates 26 depending from two sides of said top plate defining the right angle. The top plate 25 is raised by said side plates 26 to a height slightly exceeding the thickness of the slide holding frame 6' in order to form a vacant space between said top plate 25 and the bottom plate of the filing plate 20. Said corner holders 23 are always used as pairs, and in each pair, two corners 23 are spaced by the distance corresponding to the width of the slide holding frame 6' while positioning the openings of the vacant spaces of each corner holder to face toward each other. FIG. 4 shows another corner holder 24 comprising a top plate 27 and a side plate 28 depending from one side of said top plate 27 to raise said top plate 27 to a height slightly exceeding the thickness of the slide holding frame 6' in order to define a vacant space having openings in three directions between the top plate 27 and the bottom plate 20 of the filing plate. Said corner holders 24 are always used in a pair by spacing two corner holders 24 in such a manner that said side plates 28 are placed in parallel at a distance corresponding to the width of the slide holding frame 6' and said top plates 27 extend toward each other from said side plates. The slide holding frame 6' is inserted into the filing plate 20 by passing underneath the top plates 27 of a pair of corner holders 24 until the tip end corners of the slide holding frame 6' are fitted into a pair of said corner holders 23, and then held securely by said holders 23 and 24.

As mentioned in the foregoing, in conventional slide holding frames, if the total number of photographic film slides to be stored therein is increased, then the size of each slide holding frame 6' and accordingly the filing plate 20 will become considerably larger. According to the invention, the number of film slides held in each slide holding frame is increased to a great extent by improving the space factor in the frame.

Referring to FIGS. 6, 8 and 9 showing a slide holding frame and a projector embodying the invention, reference numeral 1 designates the body of the projector, 2 condenser lenses thereof, 3 projection lenses, 4 a window for the light source, 5 a guide frame for the slide holding frame 6 located in front of the window 4 for the light source, and cylinder 1' is a connector for connecting a cylindrical holder 1" of the projection lenses 3 to the body 1 of the projector.

The generally rectangular slide holding frame 6 consists of a side wall 7 surrounding the outer peripheries of the frame, a plurality of steps 9 having heights approximately equal to the thickness of the film slide S to be held by the slide holding frame 6 and placed within said frame 6 in parallel to shorter sides of the rectangular side wall 7 at a suitable interval, a number of bottom walls 8 extending in zig-zag fashion from the top edge of each step 9 to the bottom edge of its adjacent step, a plurality of substantially square windows 10 provided on each bottom wall 8 with a side thereof on said top edge of each step 9 which is substantially longer than the longer side of the photographic film portion of each slide, and a plurality pairs of suitably shaped resilient holding lugs 11 preferably made by punching out a part of each bottom wall 8 on opposite sides of each window 10. The openings 12 are left on the wall 8 when such lugs are punched out therefrom, and there are intermediate portions 13 on each bottom wall 8 between adjacent windows 10. It is preferable to form dents 14 on those portions of the bottom wall 8 at opposite sides of each window 10 which are facing holding lugs 11 and close to steps 9 so that film slides may be inserted easily by passing them underneath said holding lugs through said dents. It is preferable to bend both ends of each holding lug 11 downward while securing the central portion of the lug to said side wall 7 so that the peripheral blank portions $c$ of each film slide S may be pressed down tightly against the bottom wall 8 by means of thus bent end portions of the lug 11. The resilient holding lug 11 can be also made by moulding as an integral part of the side wall 7 instead of punching and shaping out of the bottom wall 8. A desired slide held in said slide holding frame 6 can be selected during the projecting operation by moving the slide holding frame by means of a rack 15 to be engaged with a toothed feeding device (not shown) of the projector. Such rack 15 can be made by moulding it as in integral part of the side wall 7 of the slide holding frame 6 or securing it on the side wall 7 after manufacturing it separately.

FIG. 6 illustrates two photographic film slides S inserted in the central section of the slide holding frame 6, wherein it is shown that the peripheral blank portions, for example mounting board paper portions, of adjacent film slides are overlapped with each other, and a greater number of film slides can be thus held by the slide holding frame in a partially overlapping state in succession.

As shown in the foregoing with reference to FIGS. 6, 8 and 9, the overlapping of the peripheral blank portion $c$ on either side of each film slide S with similar blank portion $c$ on opposite side of its adjacent film slide S in succession will not only enable an additional number of photographic film slides to be held in a slide holding frame 6 of a given dimension, but also effect a simplification in insertion and removal procedures for each film slide after it is selected and projected. Thereby, the ordinal sequence of film slides in a slide holding frame 6 can be adjusted very easily and a great number of photographic film slides can be stored in good manner by keeping them in such slide holding frames with a substantially increased space factor. Any film slide stored in such a manner can be projected at any time with utmost ease as held by said slide holding frame.

As shown in FIGS. 6 and 8, the photographic slides are inserted into the slide holding frame 6 at an angle $\beta$ to the longitudinal center line of the holding frame in order to overlap the peripheral blank portions of adjacent film slides S in a step like manner, and hence if such a slide holding frame 6 is inserted into a conventional projector 1 having a guide frame to feed the holding frame horizontally in a direction normal to a vertical plane including the optical axis Z of a light beam emerging from condenser lenses 2 of the projector, then the film in each slide will intersect said optical axis Z at an angle different from the right angle. Due to such angular relations between the optical axis Z and the film of each slide, unless some modification is made, it is impossible to bring an entire expanse of the film thus held into focus at a time, that is to say, if one side of the film which is close to a step 9 is focused, then the other side of the film which is farthest from the step 9 will be out of focus.

One of the objects of the invention is to eliminate said difficulty in focusing by providing a novel guide means 5 located in front of the window 4 for the light source of the projector body 1. Said guide means 5 is adapted to compensate for said angular relations of the film slide S with the optical axis Z by means of feeding the slide holding frame 6 at a compensatory angular relation to said optical axis Z of the light beam proceeding from the condenser lenses 2 toward the projection lenses 3.

FIG. 7 shows the guide means 5 for feeding the slide holding frame 6 in said angular relation to the optical axis Z, which comprises a pair of mounting bars 17, which engages with a cooperating pair of receiving rails 16 secured vertically along both sides of the light source window 4 of the front wall of the projector body 1 as shown in FIG. 8, a pair of guide rails 18 to guide the direction of the movement of the slide holding frame 6, and a wedge-like bored connector 19 to connect said mounting bars 17 and said guide rails 18, wherein said wedge-like connector 19 is adapted to let the guide rails 18 feed the slide holding frame 6 horizontally at an angle α to the optical axis Z, said angle α being the supplement of the angle β between the longitudinal center line of the slide holding frame 6 and each slide S held securely therein due to partial overlapping of adjacent slides therein. Thereby, as shown in FIG. 8 the photographic film of each slide S is kept at right angles with the optical axis Z of the light beam passing through said photographic film regardless of the position of the slide holding frame 6 in the projector, and thus the entire image of the selected film slide will be focused simultaneously as in the case of a conventional slide projector.

As described in the foregoing, according to the invention, a plurality of slide holding frames 6 having several film slides S in a row can be placed on a filing plate 20 by means of corner holders 23, 24 so that a number of such filing plates may be filed together in an album form for storing, exhibiting, viewing, inspecting, indexing and selecting a great number of photographic film slides with ease. With said filing plates of the invention, the procedure of projecting the desired film slides by conventional slide projectors is simplified to a considerable extent by removing several film slides at a time in said slide holding frame from the filing plate and inserting them in the projector.

According to the invention, it is also made possible to increase the number of photographic film slides to be held in a slide holding frame of given dimension be means of overlapping a peripheral blank portion c on either side of the film in each slide S with an opposite side blank portion c of the adjacent slide S in succession. The photographic film of each slide held in such a slide holding frame is inclined with respect to the longitudinal center line of the slide holding frame due to said partial overlapping, however, such photographic film of the slide can be projected in sharp focus throughout the entire extent thereof by means of a special guide frame, which is adapted to compensate said inclination of each slide and set said film of each slide perpendicular to the optical axis Z of the light beam emerging from the condenser lenses and passing through said film.

What I claim is:

1. A file plate for filing a plurality of slide holding frames 6; which comprises a generally rectangular-shaped bottom plate 20 having a series of filing holes 21 along one side edge thereof for filing a number of such filing plates in an album form; a plurality pairs of first corner holders 23 consisting of a right-angled triangular top plate 25 and a pair of side plate 26 depending from two sides of said top plate defining the right angle, each pair of said first corner holders 23 being secured substantially along one side of the bottom plate 20 while raising top plates 25 from said bottom plate 20 by means of said side plates 26 by a height slightly exceeding the thickness of the slide holding frame 6 to be filed therein so as to form vacant space between said top plates 25 and the bottom plate 20, one of each pair of corner holders 23 being spaced from the other one of said pair by a distance corresponding to the width of the slide holding frame 6 so as to make the openings of said vacant spaces of each corner holder face toward each other; and a plurality pairs of second corner holders 24 consisting of a top plate 27 and a side plate 28 depending from one side of said top plate 27, each pair of said second corner holders 24 being secured on the bottom plate 20 along the opposite side thereof to said first corner holders 23 while raising said top plates 27 by the height slightly exceeding the thickness of the slide holding frame 6 so as to define vacant spaces between the top plates 27 and the bottom plate 20, one of each pair of second corner holders 24 being spaced from the other of said pair in such a manner that said side plates 28 of said pair of second corner holders are placed in parallel at a distance corresponding to the width of the slide holding frame 6 while said top plates 27 of said pair of second corner holders extend towards each other from said side plates 28; wherein the positions of said pair of first corner holders 23 being correleted with those of said pair of second holders 24 in such a manner that each slide holding frame 6 may be inserted into the filing plate by passing underneath the top plates 27 of a pair of second corner holders 24 until the tip end corners of the slide holding frame 6 are fitted into a pair of said first corner holders 23 so that said slide holding frame 6 may be held securely on the bottom plate 20 by said corner holders 23 and 24.

2. A slide-holding frame for individually replaceably holding a number of photographic film slides at a high space factor, which comprises a rectangular side wall (7) forming a rigid peripheral border of said slide-holding frame to guide the movement thereof, a plurality of steps (9) having a height approximately equal to the thickness of the film slide (S) to be held therein and located within said frame (6) at intervals in parallel to shorter sides of the rectangular side wall (7), a plurality of bottom walls (8) extending in zigzag fashion from the top edge of each step (9) to the bottom edge of the adjacent step, a plurality of substantially square windows (10) on each bottom wall (8) with a side thereof on said top edge of each step (9), each side of said square window (10) being slightly longer than the longer side of the photographic film portion of each slide to be shown, a rack (15) formed on a longitudinal edge of said slide-holding frame outside of said side wall (7), and a plurality of pairs of resilient holding lugs (11) extending from said side wall (7) on the opposite side of each slide for urging the slide against the bottom plate (8), thereby receiving a plurality of slides in a row within the slide-holding frame (6) by inclining each slide by an angle β with respect to the longitudinal axial center line of the frame in order to successively overlap a peripheral blank portion (c) on either side of the photographic film of each slide (S) with a similar peripheral blank portion (c) on the opposite side of an adjacent slide (S).

(References on following page)

References Cited

UNITED STATES PATENTS

| | | |
|---|---|---|
| 1,032,798 | 7/1912 | Zimmerman. |
| 2,521,792 | 9/1950 | Hollander 129—20 |
| 2,637,325 | 5/1953 | McCabe 129—20 |
| 2,276,735 | 3/1942 | Miller. |
| 2,903,808 | 9/1959 | Anderson. |
| 3,277,598 | 10/1966 | Lightburn. |
| 3,324,765 | 6/1967 | Smith. |

FOREIGN PATENTS

| | | |
|---|---|---|
| 1,231,770 | 4/1960 | France. |
| 634,307 | 4/1963 | Belgium. |
| 100,334 | 3/1937 | Australia. |

NORTON ANSHER, Primary Examiner

R. M. SHEER, Assistant Examiner

U.S. Cl. X.R.

40—63, 158; 129—20